United States Patent [19]

Hofmann

[11] Patent Number: 4,667,787
[45] Date of Patent: May 26, 1987

[54] APPARATUS FOR REGULATING A VEHICLE CLUTCH

[75] Inventor: Rainer Hofmann, Stuttgart, Fed. Rep. of Germany

[73] Assignee: Daimler-Benz Aktiengesellschaft, Fed. Rep. of Germany

[21] Appl. No.: 698,796

[22] Filed: Feb. 6, 1985

[30] Foreign Application Priority Data

Feb. 7, 1984 [DE] Fed. Rep. of Germany ....... 3404156

[51] Int. Cl.$^4$ .................................................. B60K 41/28
[52] U.S. Cl. .............................. 192/0.032; 192/0.052
[58] Field of Search ............... 192/0.032, 0.033, 0.034, 192/0.03, 0.052, 0.076, 0.077, 0.092, 103 R, 30 V, 3.58

[56] References Cited

U.S. PATENT DOCUMENTS

| 3,203,518 | 8/1965 | Peras . |
| 4,019,614 | 4/1977 | Prenzel et al. . |
| 4,343,387 | 8/1982 | Hofbauer . |
| 4,553,654 | 11/1985 | Bofinger et al. ................. 192/0.076 |

FOREIGN PATENT DOCUMENTS

| 2700788 | 7/1978 | Fed. Rep. of Germany . |
| 0043660 | 6/1981 | Fed. Rep. of Germany . |
| 3004930 | 8/1981 | Fed. Rep. of Germany . |
| 3125923 | 1/1983 | Fed. Rep. of Germany . |
| 7206375 | 9/1973 | France . |
| 2525163 | 4/1983 | France . |
| 160724A | 10/1982 | Japan . |
| 160725A | 10/1982 | Japan . |
| 141936A | 8/1983 | Japan . |
| 2080910 | 2/1982 | United Kingdom ............. 192/0.032 |
| 0057322 | 8/1982 | United Kingdom ............. 192/0.032 |

OTHER PUBLICATIONS

"Microprocessor Clutch Control", Falzoni, Pellegrino, & Troisi.

Primary Examiner—George H. Krizmanich
Attorney, Agent, or Firm—Barnes & Thornburg

[57] ABSTRACT

An improved control apparatus provides a feedback control system for engaging selectively a clutch of a vehicle. The vehicle includes an engine, an engine shaft, and a drive train comprising a clutch assembly including clutch input and output members; a drive shaft, and a wheel assembly. The apparatus includes a servomotor for engaging and disengaging the clutch members, a first sensor for detecting an angular velocity of the clutch input member, a second sensor for detecting an angular velocity of the drive shaft, and a third sensor for detecting the instantaneous torsional moment transmitted by the drive shaft to the wheel assembly. The apparatus further includes a feedback control unit for attenuating vibration in the vehicle drive train. The feedback control unit includes a data processing unit for interpreting the parameters detected by the first, second, and third sensors to monitor torsional vibrations in the drive train, and a regulator unit to engage selectively the clutch and input and output members to regulate thereby the moment of the clutch to cause each of the torsional moment transmitted by the drive shaft and the angular velocity of the engine shaft to approach a constant value so that unwanted torsional vibrations in the vehicle drive train are dynamically monitored and attenuated.

5 Claims, 3 Drawing Figures

APPARATUS FOR REGULATING A VEHICLE CLUTCH

BACKGROUND AND SUMMARY OF THE INVENTION

The invention relates to a feedback control system for a vehicle clutch, and particularly to an apparatus for automatically operating a vehicle clutch during starting so that torsional variations in the vehicle drive train are attenuated. More particularly, the invention relates to an apparatus having a servo-motor for engaging and disengaging the clutch, measuring sensors for detecting the rotary speeds upstream and downstream of the clutch and the gear stages of a shift gear to provide measured values which are fed to a regulating device which forms from the measured values an output signal which is applied to the servo-motor.

An apparatus of the above-mentioned type is known from German Unexamined Published Application No. 3,004,930. During the starting of the vehicle, by touching a manual switch lever, the clutch is disengaged by a regulating device, and after the engagement of the gear and operation of the accelerator pedal the engine is first of all adjusted to a prescribed engine speed by the regulating device, and then the clutch is engaged again slowly. As soon as the engine speed falls due to an absorption of torque by the clutch, the engagement process is interrupted by the regulating device and is permitted again only when the engine speed has again attained the prescribed value. This regulation process is repeated until approximate equality of rotary speed exists between clutch plate and engine. Only then does the known regulating device permit the clutch to be engaged completely.

It is a disadvantage that in the known clutch regulation system that torsional vibrations which occur in the drive train during starting, and which cause disagreeably pronounced accelerations and vibrations in the vehicle, are not taken into consideration. The reason for this is that the drive train constitutes a component elastic in rotation, which can be tensioned and relaxed like a torsion spring during the starting process as a result of the continuous variations in the clutch moment, whereby jerky accelerations and vibrations can be produced in the vehicle.

Particularly in the case of vehicles having a long drive train and leaf springs as axle suspension means, as for example in the case of commercial vehicles, the drive train possesses a relatively low torsional rigidity, due to which particularly disagreeable vibrations can be produced. The sensitive manuevering of such vehicles is made more difficult by the low torsional rigidity.

According to the present invention, the improved apparatus provides a feedback control system for selectively engaging a clutch of a vehicle having an engine, an engine shaft, and a drive train comprising a clutch assembly including clutch input and output members, a drive shaft, and a wheel assembly. The apparatus includes servo-motor means for engaging and disengaging the clutch members, first measuring sensor means for detecting the angular velocity of the clutch input member, second measuring sensor means for detecting the angular velocity of the drive shaft, and third measuring sensor means for detecting the instantaneous torsional moment transmitted by the drive shaft to the wheel assembly.

The apparatus further includes feedback control means for attenuating vibration in the vehicle drive train, the feedback control means including data processing means for intepreting the parameters detected by the first, second, and third measuring sensor means to monitor torsional vibrations in the drive train, and regulator means to engage selectively the clutch members to regulate thereby the moment of the clutch to cause each of the torsional moment transmitted by the drive shaft and the angular velocity of the engine shaft to approach a constant value so that unwanted torsional vibrations in the vehicle drive train are dynamically monitored and attenuated.

The underlying aim of the present invention is to improve the known apparatus for automatically operating a clutch so that the torsional variations in the drive train are attenuated during starting.

This aim is achieved according to the invention in that measuring sensors are arranged on the drive train leading from the clutch to the driven wheels to detect the angular velocity applied to the clutch on its input side, the angular velocity of the drive shaft on the output side of the clutch, and the torque to be transmitted by the drive train. The above-noted detected values are likewise fed to the feedback control means. The output of the feedback control means influences the servo-motor means via the regulator means so that such a clutch moment ($M_2$) is applied to the clutch to cause the torsional moment ($M_3$) and the engine speed ($\omega_1$) to approach a constant value.

One advantage achieved by the present invention is that the torsional vibrations in the drive train are attenuated by deliberate variations in the clutch moment caused by the improved apparatus, to obtain a jerk-free and uniform acceleration of the vehicle. This improved clutch regulation system further permits a sensitive centimeter-accurate maneuvering of the vehicle. Lastly, a uniform torque curve is also achieved which exhibits no transient maximum values to protect the drive units better.

Further objects, features, and advantages of the present invention will become more apparent from the following description when taken with the accompanying drawing which shows, for purpose of illustration only, an embodiment in accordance with the present invention.

DETAILED DESCRIPTION OF THE DRAWING

Figure 1:
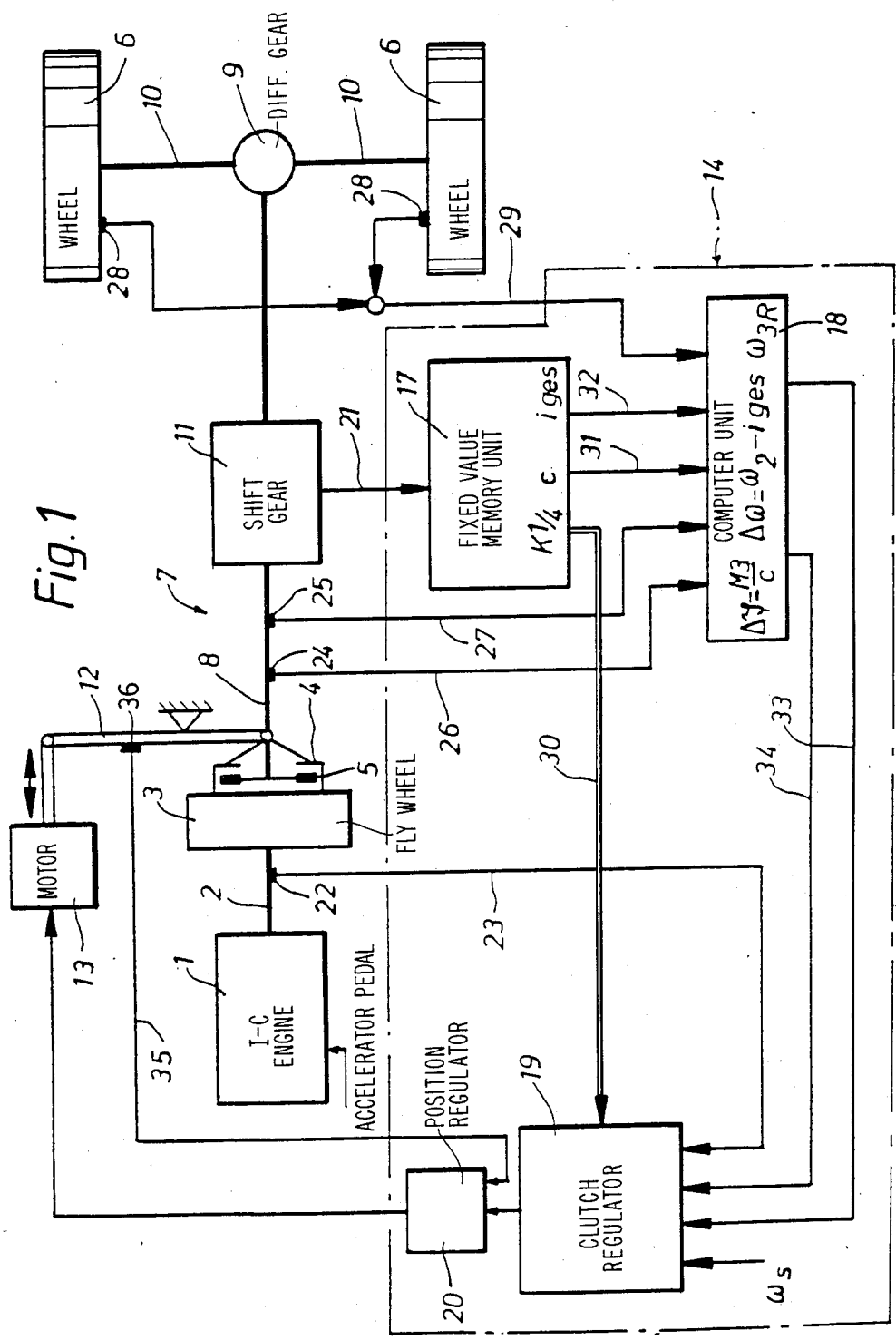
FIG. 1 is a diagrammatic representation of a preferred embodiment of the present invention showing a block circuit diagram an improved clutch regulation device on a diagrammatically illustrated vehicle.

In FIG. 1, the reference numeral 1 designates an internal-combustion engine of the vehicle, not further shown, particularly of a commercial vehicle. A flywheel 3 is attached to the output shaft 2 of the engine 1. A clutch assembly which includes a clutch input member 4 is connected by flanges to the output side of the flywheel 3. The clutch 4 assembly further includes a clutch output member 5 which is connected to a drive train 7 leading to the driven wheels 6. The drive train 7 is composed of a drive shaft 8, axial shafts 10 leading from a differential gear 9 to the driven wheels 6, and a shift gear 11. The engagement and disengagement of the clutch assembly occurs via a control level 12 from a servo-motor 13, which receives appropriate control values from a feedback control device generally designated 14.

The determination of the regulating rules, by means of which, in the last resort, the servo-motor 13, via the control lever 12, adjusts the clutch assembly so that the torsional vibrations in the drive train 7 are attenuated, is effected in conformity with the dynamic behavior of the drive train 7, of the clutch, and of the drive engine. In order to simplify the representation of the dynamic processes occuring in the drive train, the vehicle from FIG. 1 is transformed into a simplified vibraation representative model according to FIG. 2. The model includes the engine 1, by which an engine torque $M_1$ is generated for the rotary speed $\omega_1$ at the output shaft 2 and is transmitted by the latter to the flywheel 3 with a mass moment of inertia $J_1$. The model also includes a clutch assembly having an input member 4 that is characterizable by moment $M_2$, and an output member 5 which has a mass moment of inertia $J_2$ and upon which the clutch moment $M_2$ acts. From there a torsion shaft 15, the representative model for the drive shaft 8 and the axle shaft 10, having the torsional rigidity "c" transmits the torque $M_3$ to a flywheel 16 having a mass moment of inertia $J_3$. Flywheel 16 represents the mass of the vehicle in the variation model of FIG. 2. The speed of rotation and angle of rotation of flywheel 16 are designated $\omega_3$ and $\phi_3$. The transmission ratios of the shift gear i and of the drive axle $i_H$ are taken into consideration.

Figure 2:
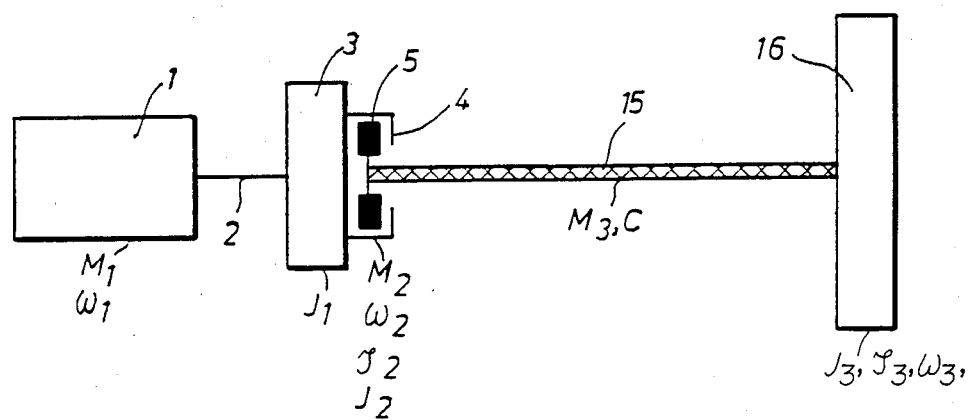
FIG. 2 shows a diagrammatic representation of a simplified reduced mass system of the vehicle illustrated in FIG. 1.

The dynamic behavior of the reduced drive train according to FIG. 2 is described by the following system of differential equations:

$$\frac{d\omega_1}{dt} = \frac{M_1 - M_2}{J_1}$$

$$\frac{a(\Delta\omega)}{dt} = \frac{M_2}{J_2} - \frac{M_3}{J}$$

$$\frac{a(\Delta\phi)}{dt} = \Delta\omega$$

$\Delta\omega$ and $\Delta\phi$ are the differences of the speeds of rotation and angles of rotation at the ends of the torsion shaft. The moment of comparison J is obtained from the relation:

1/J=1/$J_2$+1/$J_3$

Figure 3:
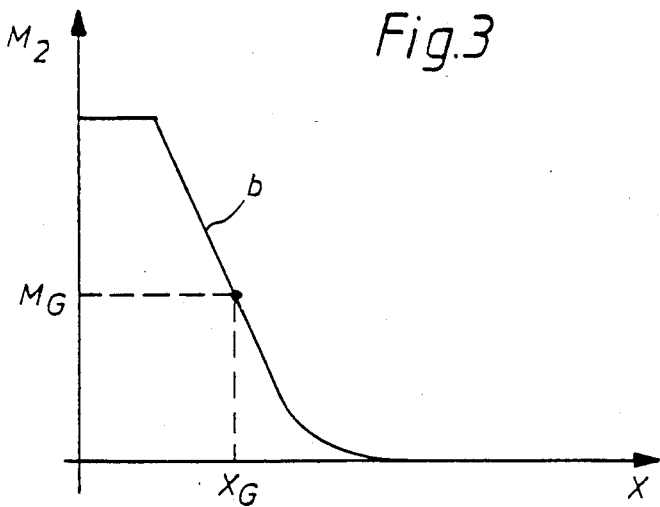
FIG. 3 is a graphic representation of a clutch characteristic showing a plot of the clutch moment ($M_2$) as a function of the clutch disengagement stroke (x).

The value of $M_1$ is prescribed by the driver by means of the accelerator pedal and should afterward have the constant value $M_1 = M_G$, $M_G$ being the torque acting in the desired equilibrium state of the system. The value of the clutch moment $M_2$ is determined in accordance with the clutch characteristic from FIG. 3 as a function of the disengagement stroke x of the clutch by the formula:

$M_2 = M_G - b(x - x_G)$ where "$X_G$" designates the point just where the moment "$M_G$" can be transmitted by the clutch, and "b" represents the slope of the characteristic. The correlation:

$M_3 = (c)(\Delta\tau)$ exists between the torsional moment $M_3$ and the angle of twist $\Delta\phi$ of the imaginary torsion shaft. The behavior in time of the position regulating system containing the servo-motor 13 must also be taken into consideration in describing the regulation process. This correlation will be assumed by a first order delay element by the equation:

$$(T)\frac{dx}{dt} + x = x_s$$

where T denotes the time constant of the position regulating system, $x_s$ the desired value of the disengagement stroke, and x the actual disengagement stroke of the clutch.

It is a basic condition for the freedom from vibration in the transmission of the torque, that constant moments are transmitted from the engine toward the driven wheels 6 in each case. This can be represented in summary form as follows:

$M_1$=constant,
$M_2$=constant, and
$M_3$=constant.

By way of example, the following linear statement may serve as a regulating rule according to which the clutch is to be controlled:

$$Ax_s = K_1(\omega_s - \omega_1) + K_2\left(\frac{d\omega_s}{dt} - \frac{d\omega_1}{dt}\right) + K_3(\Delta\phi) + K_4(\Delta\omega)$$

wherein $K_i$=regulating parameter,
$\omega_s$=desired value of engine angular velocity,
$\omega_1$=angular velocity of engine shaft,
$d\omega_s/dt$=first derivative of $\omega_s$ with respect to time,
$d\omega_1/dt$=first derivative of $\omega_1$ with respect to time,
$\Delta\phi$=angle of twist of imaginary torsion shaft, and
$\Delta\omega$=difference of angular velocity between clutch $\omega_2$ and representative flywheel $\omega_3$.

The coefficients $K_i$ contained in the regulating rule must now be determined so that a stable starting process with a favorable build-up behavior of the drive train 7 is obtained. The values of the coefficients $K_i$ may be determined either by experiments or by calculation from a stability study of the overall dynamic behavior of the system.

A system regulated in this way is described by a coupled system of differential equations. In the present case the homogeneous parts of this system of equations, which are alone decisive of the stability of the regulated process, read as follows:

$$\frac{d\omega_1}{dt} = \frac{b}{J_1}(x)$$

-continued $$A \frac{d(\Delta\omega)}{dt} = -\frac{c}{J}(\Delta\tau) - \frac{b}{J_2}(x)$$

$$A \frac{d(\Delta\phi)}{dt} = \Delta\omega$$

$$A \frac{dx}{dt} = -\frac{K_1}{T}(\omega_1) + \frac{K_4}{T}(\Delta\omega) + \frac{K_3}{T}(\Delta\phi) -$$

$$\frac{1}{T}\left\{1 + \frac{(b)(K_2)}{J_1}\right\}(x)$$

This homogeneous system of differential equations, which describes the build-up behavior to a state of equilibrium, has as its solution a linear combination of $e^{pt}$, the inherent values p being determined by the characteristic equation:

$$p^4 + \lambda_3 p^3 + \lambda_2 p^2 + \lambda_1 p + \lambda_0 = 0$$

The coefficients $\lambda_0$ and $\lambda_3$ are a function of the system values (spring rigidity, moments of inertia, clutch characteristic, etc.) and of the adjustment of the regulator (coefficients $K_1$ to $K_4$):

$$\lambda_0 = \frac{(b)(c)(K_1)}{(T)(J_1)(J)}$$

$$\lambda_1 = \frac{(b)(c)(K_2)}{(T)(J_1)(J)} + \frac{c}{(T)(J)} + \frac{(b)(K_3)}{(T)(J_2)}$$

$$\lambda_2 = \frac{c}{J} + \frac{(b)(K_1)}{(T)(J_1)} + \frac{(b)(K_4)}{(T)(J_2)}$$

$$\lambda_3 = \frac{1}{T} + \frac{(K_2)(b)}{(T)(J_1)}$$

The regulator must now be adjusted so that a stable starting process results. This is the case when the stability conditions:
1. all the coefficients $\lambda_0$ to $\lambda_3$ are present and positive, and
2. $(\lambda_1 \lambda_2 \lambda_3) - \lambda_1^2 - (\lambda_0 \lambda_3^2) > 0$ are fulfilled. In this case all the inherent values have only negative real parts, so that the build-up processes decay to an equilibrium state with increasing time. Appropriate regulating parameters can thus be determined for each gear stage.

The feedback control device 14 is illustrated by way of example in FIG. 1, by means of which the clutch 4 can be adjusted so that torsional vibrations in the drive train 7 are attenuated, comprises data processing means including a fixed value memory unit 17 such as a ROM, a computer unit 18, and regulator means including a clutch regulator 19, and a position regulator 20.

In the fixed value memory 17, the characteristic values, such as torsional rigidity, "c", the overall transmission ratio $i_{tot}$ resulting from the respective gear transmission and axle transmission, and the values $K_i$, which characterize the drive train 7, are stored for each gear stage. A measuring sensor 22 which is present on the output shaft 2, determines the speed of rotation $\omega_1$ of the engine and feeds it via a signal line 23 directly to the clutch regulator 19. Measuring sensors 24 and 25, which are attached to the drive train 7, transmit the speed of rotation of the drive shaft 8 via the signal line 26, and the instantaneous torsional moment transmitted by the drive shaft 8 via a further signal line 27, directly to the computer unit 18. Lastly, measuring sensors 28, which transmit the speed of rotation detected at the driven wheels as a mean value $\omega_{3R}$ via the signal line 29 to the computer unit 18, are also present on the driven wheels 6.

As a function of the respective gear stage engaged, which is detected via the signal line 21, the corresponding data of the fixed value memory 17 are then read out in the context of a microprocessor system and transmitted via the signal line 30 to the clutch regulator 19 ($K_i$) and via the signal lines 31 and 32 to the computer unit 18.

The other characteristic values "c" and $i_{tot}$ which are likewise a function of the respective gear stage engaged, are fed via the signal lines 31 and 32 to the computer unit 18. The computer unit 18 determines from the characteristic value $i_{tot}$ and from the measured values $\omega_2$, $\omega_{3R}$ any rotary speed difference $\Delta\omega$ appearing in the drive train, and from the torque $M_3$ instantaneously transmitted by the drive train and from the torsional rigidity "c" existing according to the gear stage engaged, a given difference of rotary angle $\Delta\phi$. These two values, which represent the instantaneous vibration state of the drive train 7, are fed via the signal lines 33 and 34 to the clutch regulator 19. In the clutch regulator an output value $x_s$ is calculated from the characteristic values fed in and from a prescribed rotary speed value of the engine, in accordance with the regulating rule. This output value $x_s$ is fed to the position regulator 20, which compares it with the instantaneously existing disengagement stroke x, which is fed from sensor 36 via the signal line 35, and in the case of a resulting deviation controls or otherwise instructs the servo-motor 13 in such a manner that existing deviations are eliminated.

Although the invention has been described in detail with reference to certain preferred embodiments and specific examples, variations and modifications exist within the scope and spirit of the invention as described and defined in the following claims.

What is claimed is:
1. In a vehicle having an engine, an engine shaft, and a drive train comprising a clutch assembly including clutch input and output members, a drive shaft, and a wheel assembly, the improvement comprising:
  servo-motor means connected to the clutch assembly for engaging and disengaging the clutch input and output members,
  first measuring sensor means for detecting an angular velocity of the clutch input member,
  second measuring sensor means for detecting an angular velocity of the drive shaft, and
  third measuring sensor means for detecting the instantaneous torsional moment transmitted by the drive shaft to the wheel assembly, and
  feedback control means for attenuating vibration in the vehicle drive train, the feedback control means including data processing means for interpreting the parameters detected by the first, second and third measuring sensor means to monitor torsional vibrations in the drive train, and regulator means to inter-engage selectively the clutch input member and the clutch output member to regulate thereby the moment of the clutch to cause each of the torsional moment transmitted by the drive shaft and the angular velocity of the engine shaft to approach a constant value so that unwanted torsional vibrations in the vehicle drive train are dynamically monitored and attenuated.

2. The improvement of claim 1, wherein the data processing means includes a fixed value memory unit in which characteristic values determined for each gear stage of the gearbox are stored and a computer unit, and the regulator means includes a clutch regulator unit and a position regulator unit.

3. The improvement of claim 2, further comprising fourth sensor means for detecting the angular velocity of at least one wheel in wheel assembly, and first signal line means for inputting the parameters detected by the second, third, and fourth measuring sensor means into the computer unit for processing to provide an angular velocity-related signal and an angle of shaft twist-related signal, both signals being fed to the clutch regulator unit.

4. The improvement of claim 3, wherein the clutch regulator unit stores a program including the step of calculating the clutch disengagement stroke in accordance with the following equation:

$$AX_s = K_1(\omega_s - \omega_1) + K_2\left(\frac{d\omega_s}{dt} - \frac{d\omega_1}{dt}\right) +$$

-continued
$$K_3(\Delta\phi) + K_4(\Delta\omega)$$

wherein
$X_s$ is the desired value of the clutch disengagement stroke, $K_i$ are coefficients, $\omega_s$ is the desired value of engine angular velocity, $\omega_1$ is the angular velocity of the engine output shaft,
$d\omega_1/dt$ is the first time derivative of $\omega_1$,
$d\omega_s/dt$ is the first time derivative of $\omega_s$, $\Delta\phi$ is the angle of twist of the imaginary torsion shaft of the vehicle model, and $\Delta\omega$ is the difference of angular velocities between the clutch output member and a representative flywheel.

5. The improvement of claim 4, further comprising fifth measuring sensor means for detecting an instantaneously existing disengagement stroke, second signal line means for feeding the detected disengagement stroke to the position regulator unit, and third signal line means for feeding the desired value of the clutch disengagement stroke calculated in the computer unit to the position regulator unit, wherein the position regulator unit compares the instantaneously existing disengagement stroke and the calculated disengagement stroke, and regulates the servo-motor means to control operation of the clutch assembly.

* * * * *